United States Patent
Christensson

(10) Patent No.: US 6,532,447 B1
(45) Date of Patent: Mar. 11, 2003

(54) APPARATUS AND METHOD OF CONTROLLING A VOICE CONTROLLED OPERATION

(75) Inventor: Nils Christensson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 114 days.

(21) Appl. No.: 09/588,454

(22) Filed: Jun. 6, 2000

(30) Foreign Application Priority Data

Jun. 7, 1999 (SE) .............................................. 9902229

(51) Int. Cl.⁷ .......................... G10L 21/06; H04R 3/00; G05B 19/00; G08B 21/00; H03K 17/945
(52) U.S. Cl. .................... 704/275; 704/270.1; 381/122; 340/5.62; 340/307; 340/361; 340/686.6; 327/517
(58) Field of Search .............................. 704/275, 270.1, 704/200; 381/110

(56) References Cited

U.S. PATENT DOCUMENTS

| 3,109,893 A | 11/1963 | Burns ............................. 179/1 |
| 4,644,107 A | 2/1987 | Clowes et al. .............. 379/354 |
| 4,777,649 A | * 10/1988 | Carlson et al. ............. 704/225 |
| 4,901,354 A | * 2/1990 | Gollmar et al. ............. 381/110 |
| 5,007,081 A | 4/1991 | Schmuckal et al. ......... 379/354 |
| 5,224,151 A | 6/1993 | Bowen et al. ................. 379/58 |
| 5,255,341 A | * 10/1993 | Nakajima .................... 704/200 |
| 5,335,276 A | 8/1994 | Thompson et al. ........... 380/21 |
| 5,337,353 A | 8/1994 | Boie et al. .................... 379/388 |
| 5,396,443 A | * 3/1995 | Mese et al. .................. 713/321 |
| 5,657,380 A | * 8/1997 | Mozer ......................... 704/275 |
| 5,712,911 A | 1/1998 | Her ............................. 379/420 |
| 5,806,036 A | * 9/1998 | Stork .......................... 704/271 |
| 5,881,377 A | 3/1999 | Giel et al. ................... 455/343 |
| 5,890,123 A | * 3/1999 | Brown et al. ............. 704/270.1 |
| 6,188,986 B1 | * 2/2001 | Matulich et al. ............ 704/275 |
| 6,243,683 B1 | * 6/2001 | Peters ........................ 704/275 |

FOREIGN PATENT DOCUMENTS

EP   0 541 439   11/1992

OTHER PUBLICATIONS

Landström, R.; International–Type Search Report, May 4, 2000, Search Request No. SE99/00966, pp. 1–3.

* cited by examiner

Primary Examiner—Richemond Dorvil
Assistant Examiner—Daniel A. Nolan
(74) Attorney, Agent, or Firm—Jenkens & Gilchrist, P.C.

(57) ABSTRACT

An electronic device, e.g. a mobile telephone, includes speech recognition means for controlling the operation of the device in response to a voice command. The device includes a proximity sensor e.g. a capacitive, inductive, or IR-red proximity sensor, for providing a control signal indicative of whether an object is in proximity of the device, and control means for controlling the voice controlled operation of the device in response to the control signal.

4 Claims, 4 Drawing Sheets

APPARATUS AND METHOD OF CONTROLLING A VOICE CONTROLLED OPERATION

BACKGROUND

1. Technical Field

This invention relates to an electronic deice that includes speech recognition means for controlling the operation of the device in response to a spoken command.

Additionally this invention relates to a method of controlling a voice controlled operation, that includes the step of controlling an operation of an electrical device in response to a spoken command.

2. History of Related Art

The development and widespread use of mobile telephones in combination with the development within the field of speech recognition techniques have provided mobile telephones with numerous voice controlled functions.

Widespread use of mobile telephones in different environments, e.g. in cars, in streets with noisy traffic, etc. has driven the development of speech recognition techniques towards very noise tolerant speech recognition techniques capable of recognising commands in the form of e.g. words or numbers, despite the fact that the commands are pronounced by humans having different voices and using different inflections.

U.S. Pat. No. 4,644,107 discloses a voice-controlled telephone providing voice controlled dialing. A number to be dialed can be spoken digit-by-digit and dialed, automatically, or a name can be spoken and the telephone will automatically dial the number stored in a user's repertory corresponding to the spoken name.

U.S. Pat. No. 5,007,081 discloses a speech activated telephone. The speech activated telephone stores a plurality of spoken words, the telephone number and the alphanumeric word associated with each word. The telephone automatically dials the telephone number in response to an input spoken word matching the stored spoken word. In addition, the telephone number and alphanumeric text for the matched spoken word are displayed.

Proximity sensors are widely used in telephones e.g. for activating various functions.

U.S. Pat. No. 5,224,151 discloses a proximity sensor for use in a handset speakerphone that includes an infrared range detection unit built into the handset for controlling switching between a handset mode and a speakerphone mode.

U.S. Pat. No. 5,337,353 discloses a capacitive proximity sensor that includes a guard electrode and a sensor electrode separated by an insulating layer. For example for controlling switching between a handset mode and a speakerphone mode.

U.S. Pat. No. 5,712,911 discloses a telephone system for activating a speakerphone in response to an incoming call based upon the presence or absence of a subscriber within a predetermined proximity zone. The system includes a proximity unit and a control unit for automatically activating the speakerphone to establish communication with the caller when the subscriber is within the predetermined proximity zone.

U.S. Pat. No. 3,109,893 discloses a proximity operated telephone in which proximity switches are used for turning the telephone on when a subscriber passes his hand near the sensor to establish communication with the caller, and turning off the telephone when the subscriber again passes his hand near the sensor to terminate the communication with the caller.

European Patent Application No. 541439 discloses an auditory communication device using a proximity detector to activate a microphone when a speaker is present within a predetermined proximity zone. Thereby effects of ambient noise are reduced.

Thus, speech recognition means for activation of voice controlled functions and proximity sensors are well-known technical features.

Previously, speech recognition techniques were considered to be very sensitive to ambient noise and only to accept a very precise pronouncement of the commands. However, with recent developments within this field, these problems have been solved. But in fact, this has turned out to create a new problem, in that such recent speech recognition means react on spoken words, in the proximity of the speech recognition means, not intended to be a command to the speech recognition means. So in this way it is not possible to have the speech recognition means activated at all times without generating unintended results. It should be noted that one of the intentions of speech recognition is to avoid the use of buttons, keypads, and similar means which require a more or less complicated manual operation. Typically, such speech recognition means are embodied as programs executed by a central processing unit (CPU). Thus, when the speech recognition means constantly work on processing samples representing any ambient sound, much battery power is consumed by the CPU, analog-to-digital converters, etc.

SUMMARY OF THE INVENTION

An object of the present invention is to avoid unintended activation of voice controlled functions in an electrical device. A further object of the invention is to conserve battery operating power.

This is achieved when an electronic device according to the invention includes a proximity sensor for providing a control signal indicative of whether an object is in the proximity of the device and control means for controlling the voice controlled operation of the device in response to the control signal.

Consequently, the speech recognition means is activated only when it is intended to activate a function by means of a spoken command; this is determined in response to whether an object is in the proximity of the electronic device. That is, e.g., by moving a hand near the device. In this way, it is possible to avoid buttons entirely if desired, since the device can be activated by a movement and commanded by voice. This is very important for, e.g., drivers of a car, since then they only have to move, e.g., their hand close to the device instead of locating and holding down a specific button to activate the speech recognition means. Consequently, a much simpler and less distracting procedure for activating the speech recognition means is obtained.

Moreover, the invention relates to a method of detecting proximity.

BRIEF DESCRIPTION OF THE DRAWINGS

The invention will be explained more fully below in connection with a preferred embodiment and with reference to the drawings, in which.

DETAILED DESCRIPTION

Figure 1:
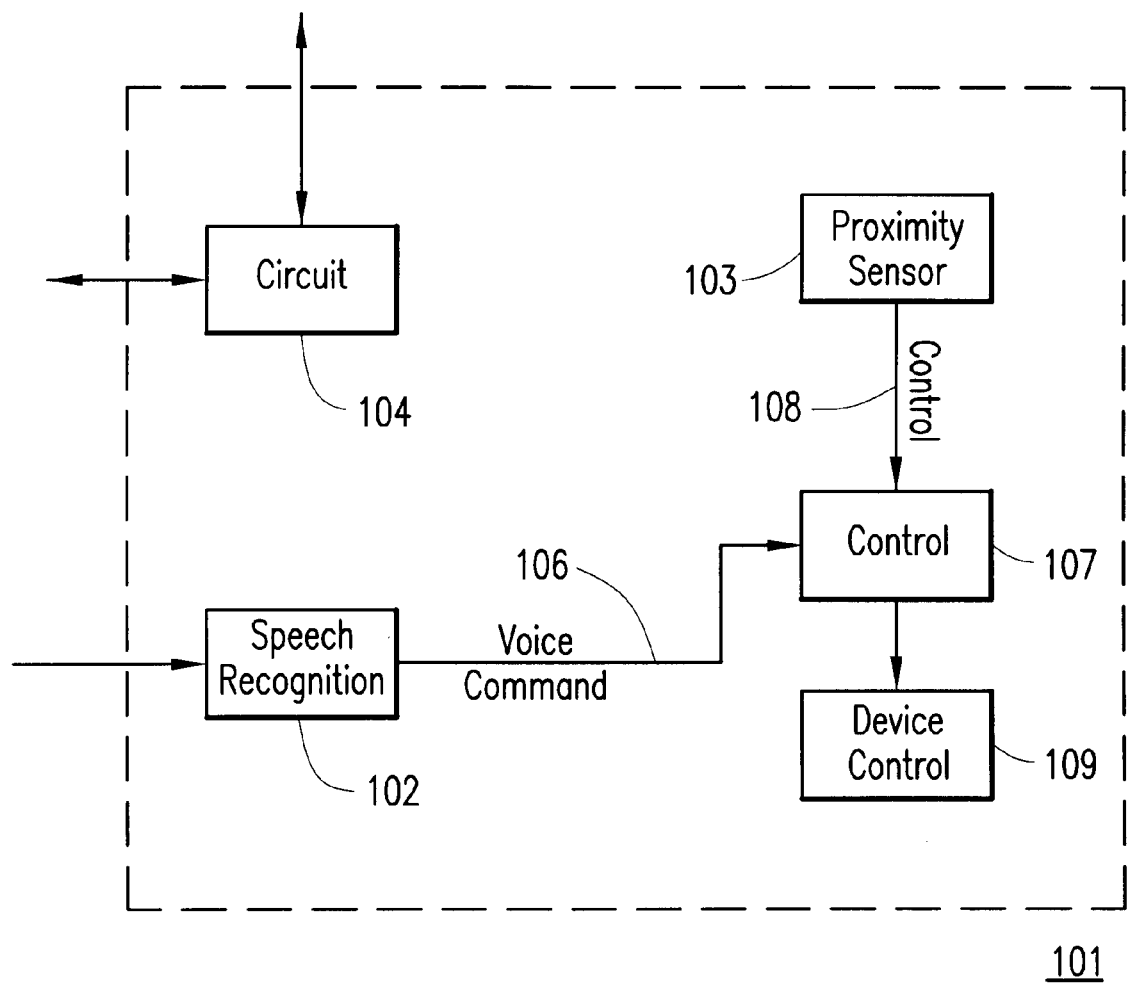
FIG. 1 shows an embodiment of the apparatus according to the present invention.

FIG. 1 shows an embodiment of an apparatus according to the present invention. Here is shown an electrical device 101 having speech recognition means 102 and a proximity sensor 103. The speech recognition means 102 may identify one or more spoken commands 105 within a stream of sound by any known technique. A voice command signal 106 representing the recognised command is sent to control means 107. Also sent to the control means 107 is a control signal 108 sent from the proximity sensor 103. The control signal 108 is generated when the proximity sensor 103 detects the presence of, e.g., a hand within a predetermined proximity zone.

The proximity sensor 103 may e.g. be a capacitive, inductive, or an infrared sensor. The sensor can detect whether an object, e.g. a hand or face, is present in the proximity of the device.

The output from the control means 107 is input in device control means 109 which controls the device 101 in response to the spoken commands. Such spoken commands could e.g. be 'dial', 'store', 'get', etc. or could be pronounced digits, names or letters.

In one embodiment the control means 107 may e.g. be a simple switch having the voice command signal 106 as input and the control signal 108 as the controlling switch signal, so when the control signal 108 is, e.g., high ("1"), the voice command signal 106 is output from the switch and when the control signal 108 is, e.g., low ("0"), nothing is output from the switch.

So in this way it is necessary to move, e.g., a hand within a predetermined proximity zone of the electrical device 101 and keep it there in order to enable speech recognition. Thereby, the problems of the electrical device 101 picking up and responding to ambient sounds and noises, which could, e.g., initiate a wrong and/or unintended command, are avoided.

However, in some situations it may not be a good idea to have to keep an object within the proximity zone all the time when speech recognition is needed. So, in a preferred embodiment of the invention, the control means 107 may be more intelligent and provide a more flexible way of controlling the speech recognition means 102 without having to keep an object in the proximity zone. The control means 107 can be embodied as a latch which toggles from an on to an off state or vice versa each time an object is moved within the proximity zone.

In another embodiment, the movement of an object within the proximity zone could activate the speech recognition means 102, which will cause the unit to stay active until some sort of termination signal is issued. This termination signal could, e.g., be provided by a timer circuit after the elapse of a predetermined period of time or after a predetermined period of time since the last received command; thereby, only one movement is needed in the proximity of the device. Another termination signal could, e.g., be provided on the basis of a specific spoken command word like stop, end, etc.

In a preferred embodiment, the electrical device 101 further comprises an electrical circuit 104 which provides communication of speech signals. In this way, a mobile or stationary telephone may be operated in a very simple manner by spoken commands. This is particularly useful when driving a vehicle or in another environment where concentration is needed, since the control of the telephone can be operated by speech alone, so the driver can concentrate on driving the vehicle. Activation of the speech recognition means may be performed by a simple wave of a hand, thereby ensuring that only speech intended as commands is registered, so words in a conversation, e.g. with a passenger, do not result in a call. This same applies to a stationary telephone located near people e.g. participating in a conference.

In a preferred embodiment, the speech recognition means 102 is included in a central processing unit or an application specific integrated circuit (ASCI). The control signal can be supplied to such a circuit as an interrupt signal. Thereby, the processor can handle other tasks than speech recognition or be in a low battery consumption mode (a so-called sleep mode) when no proximity is detected.

Other uses of embodiments of this invention may, e.g., be in an elevator, where a passenger can just say the number or the name of the floor or department and then be transported there. Here it is also expedient that the elevator does not change destination just because passengers mention a command word in a conversation.

Figure 2:
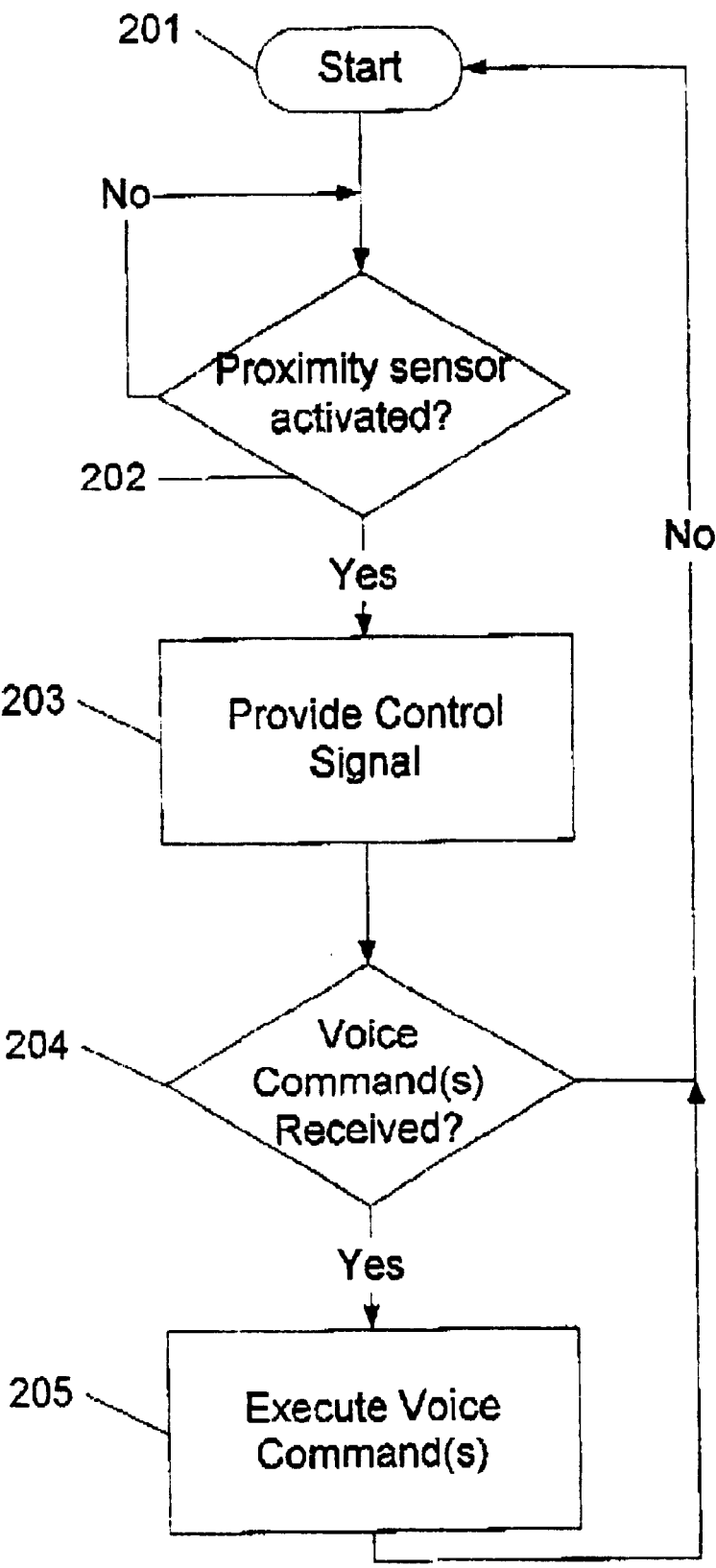
FIG. 2 shows a flow chart of an embodiment of the method according to the present invention.

FIG. 2 shows a flow chart of an embodiment of the method according to the present invention. In step 201, the method is initialised. In step 202, a test of whether the proximity sensor detects a presence within a predetermined proximity zone is performed. If this is the case, a control signal indicating that an object is in proximity is provided in step 203. If not, the method loops back and executes the test again (after an appropriate time interval).

In step 204, a test whether one or more voice commands are received is performed. If this is the case, then the commands are processed to be recognised and executed in step 205. If the result of the test is 'No', the method loops back to the beginning of the flow chart and the test in step 202 is executed again.

A predetermined time limit may be specified for receiving the voice commands in step 204. This time limit may be measured from when the proximity sensor was activated or from when the last spoken word was received. Alternatively, one or more command words may be given by the user to indicate that no more words should be considered.

If this method is used in, e.g., a mobile telephone, a very easy way of operating the telephone is obtained, since it can be operated and controlled by the voice of the user. The user only has to move an object within a predetermined proximity zone to activate the speech recognition means in the telephone and thereby indicate that succeeding words are intended as commands.

Figure 3:
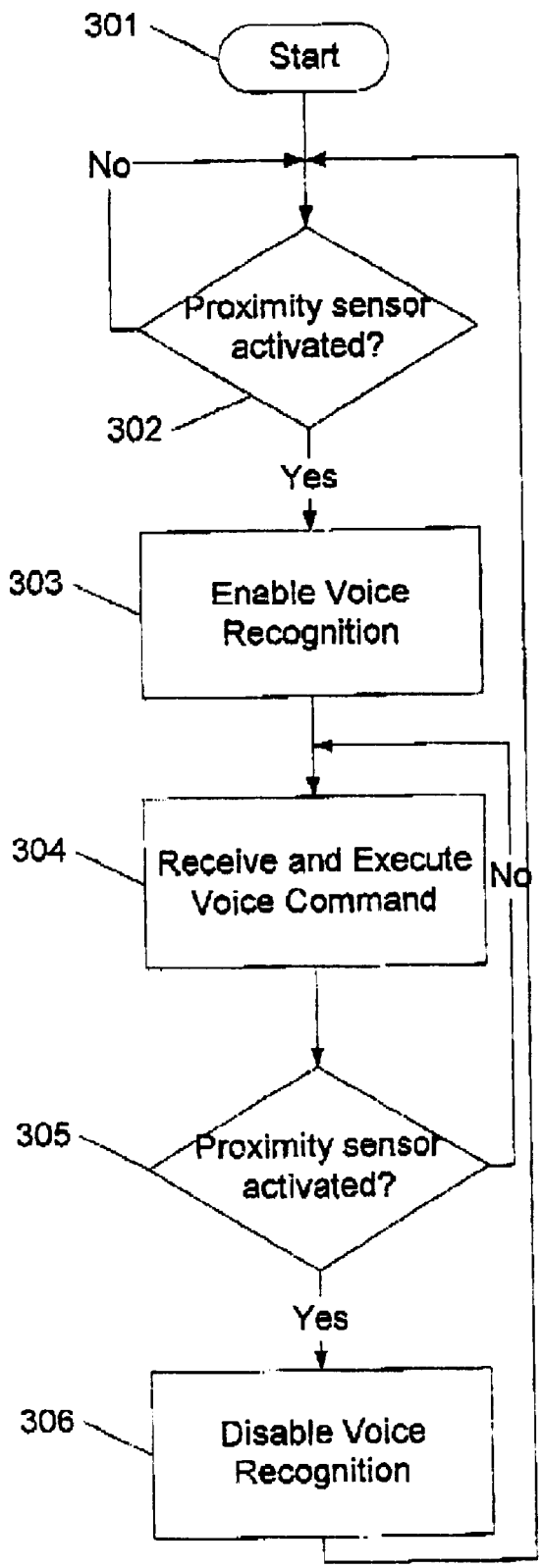
FIG. 3 shows a flow chart of another embodiment of the method according to the present invention.

FIG. 3 shows a flow chart of another embodiment of the method according to the present invention. The method is initialised in step 301. In step 302, a test of whether the proximity sensor detects a presence within a predetermined proximity zone is performed. If this is the case, a control signal indicating that an object is in proximity is given and the method proceeds to step 303. If not, the method loops back and executes the test again (after an appropriate time interval). In step 303 speech recognition is enabled as a result of the control signal. In step 304 voice commands, if any, are received, recognised and executed. After this has been done, another test is made at step 305 of whether an object is within a proximity zone. If the test is 'No', the method loops back to step 304 and is ready to receive additional commands. If the test is 'Yes', the speech recognition is disabled and the method loops back to step 302 and must have an object within the proximity zone once again to be reactivated. This gives a simple way of indicating that a given sound should not be considered a command. Additionally, the speech recognition means may go into a sleep mode in order to conserve power until needed. This mode of operation can be described as a 'Toggle' mode, since, e.g., a wave of a hand near the device of the method changes the status of speech recognition from enabled to disabled or vice versa, depending on the actual status. This gives a very simple way of turning the speech recognition 'on' and 'off'.

Figure 4:
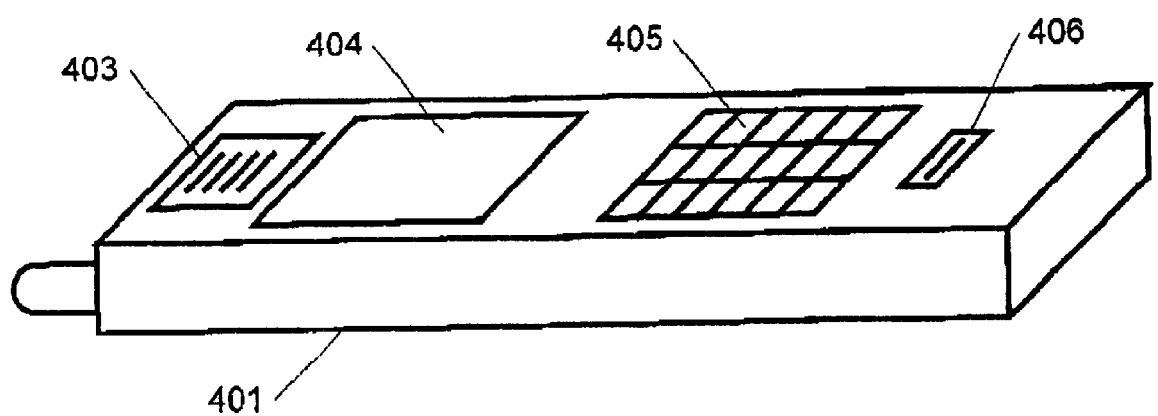
FIG. 4 shows the preferred embodiment of the invention, which may contain the electrical device and use the method according to the present invention.

FIG. 4 shows a preferred embodiment of the invention, which may contain the electrical device and/or use the method according to the present invention. Shown is a mobile telephone 401 having display means 404, a keypad 405, an antenna 402, a microphone 406, and a speaker 403. The antenna 402, microphone 406, and speaker 403 are connected to the electrical circuit 104 which provides communication of speech signals, as shown in FIG. 1. The microphone is further connected to the speech recognition means 102 also shown in FIG. 1. The proximity sensor (not shown) detects a change in the electrical or magnetic field when, e.g., a hand is moved past the telephone within a predetermined proximity zone. The proximity sensor enables the speech recognition means and the device is ready to receive voice commands operating the telephone. Another wave of the hand disables the speech recognition means, which may go into a sleeping mode in order to reduce power. This gives a very simple way of ensuring that speech containing unintended command words does not activate a command in the telephone, as described above.

In other embodiments, it may be necessary to have a hand in contact with the telephone as long as one wishes to use speech recognition, or only the first wave of a hand is needed with a time shutting the speech recognition means down after a predetermined period of time, e.g., after enabling or after the last received voice command.

In a preferred embodiment it is advantageously to have a 'hands free' mode and a 'not hands free' mode. In the 'hands free' mode, the above idea of just waving with a hand to activate the speech recognition means is used; whereas in the 'not hands free' mode it is required that proximity last in order to activate speech recognition means.

What is claimed is:

1. A communications device comprising:

speech recognition means for controlling operation of the device in response to a voice command;

a proximity sensor for providing a control signal control means for controlling the voice controlled operation of the device in response to the control signal;

wherein the device has a first mode for processing speech signals and a second mode in which speech signals are not processed, the device having lower power consumption in the second mode than in the first mode; and wherein the control signal causes a change between the first mode and the second mode.

2. The communications device of claim 1, wherein the device further comprises an electronic circuit for providing communication of speech signals.

3. The communications device of claim 1, wherein the device is portable.

4. The communications device of claim 1, wherein the device comprises a mobile telephone.

* * * * *

UNITED STATES PATENT AND TRADEMARK OFFICE
CERTIFICATE OF CORRECTION

PATENT NO. : 6,532,447 B1
DATED : March 11, 2003
INVENTOR(S) : Christensson

It is certified that error appears in the above-identified patent and that said Letters Patent is hereby corrected as shown below:

<u>Title page,</u>
Item [54], replace "APPARATUS AND METHOD OF CONTROLLING A VOICE CONTROLLED OPERATION" with -- PROXIMITY ACTUATION OF SPEECH RECOGNITION --

Signed and Sealed this

Thirtieth Day of September, 2003

JAMES E. ROGAN
*Director of the United States Patent and Trademark Office*